C. W. HALLER
Nov. 25, 1930. PICKLING CRATE Re. 17,882
Original Filed Sept. 27, 1928 2 Sheets-Sheet 1
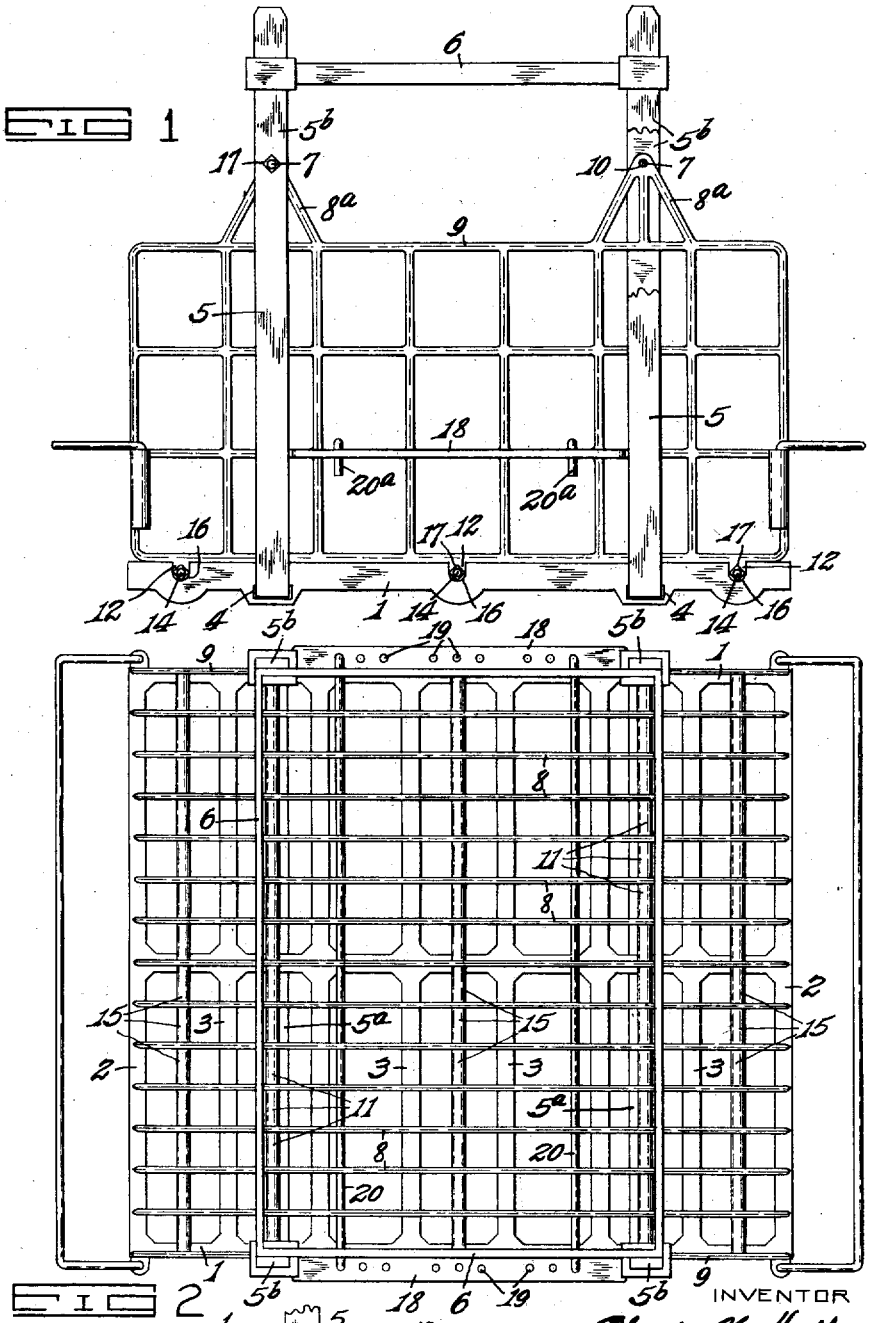
INVENTOR
Charles W. Haller
BY N. E. Dunlap
ATTORNEY

C. W. HALLER

PICKLING CRATE

Nov. 25, 1930. Re. 17,882

Original Filed Sept. 27, 1928 2 Sheets-Sheet 2

INVENTOR
Charles W. Haller
BY
N. E. Dunlap Jr.
ATTORNEY

Reissued Nov. 25, 1930 Re. 17,882

UNITED STATES PATENT OFFICE

CHARLES W. HALLER, OF WHEELING, WEST VIRGINIA, ASSIGNOR TO WHEELING BRONZE CASTING COMPANY, OF WHEELING, WEST VIRGINIA, A CORPORATION OF WEST VIRGINIA

PICKLING CRATE

Original No. 1,711,054, dated April 30, 1929, Serial No. 308,782, filed September 27, 1928. Application for reissue filed March 26, 1930. Serial No. 439,232.

This invention relates broadly to pickling crates, and it has for its primary object to provide a crate for the pickling of metal plates and sheets wherein a plurality of individual and readily separable and replaceable partitions constitute the separators or division walls between adjacent pack-receiving compartments.

A further object is to provide a crate of the character mentioned composed of numerous parts which are rigidly secured in place in such manner that but few threaded parts are presented, and in which such threaded parts as are used are so located that they are not likely to become corroded so as to require frequent renewals.

A still further object is to provide a pickling crate in which the parts most likely to be injuriously affected by the acids of the pickling bath are readily renewable at relatively small cost and without weakening the crate structure.

Another object of the invention is to provide a crate having compartment partitions so constructed as to prevent or lessen injury to the sheets of the packs or bundles in the several compartments by protrusion of a portion of any sheet outside the compartment in which it has been placed.

Other important objects will hereinafter be made apparent.

In describing the invention in detail, reference is herein had to the accompanying drawings, in which—

Figure 1 is a side elevation of the invention;

Figure 2 is a top plan view of the same;

Figure 6 is a section on line 6—6, Fig. 3; and

Figure 3:
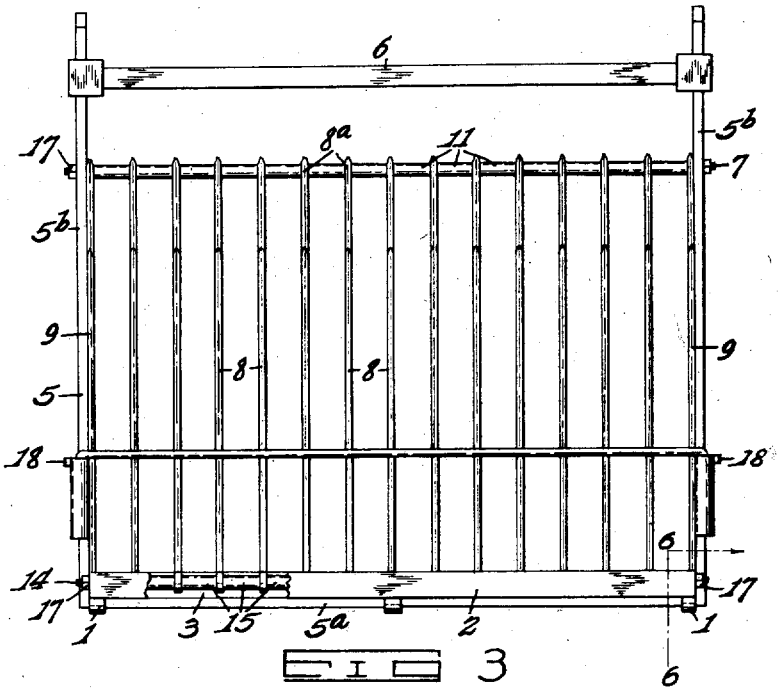
Figure 3 is an end elevation.
Figure 4:
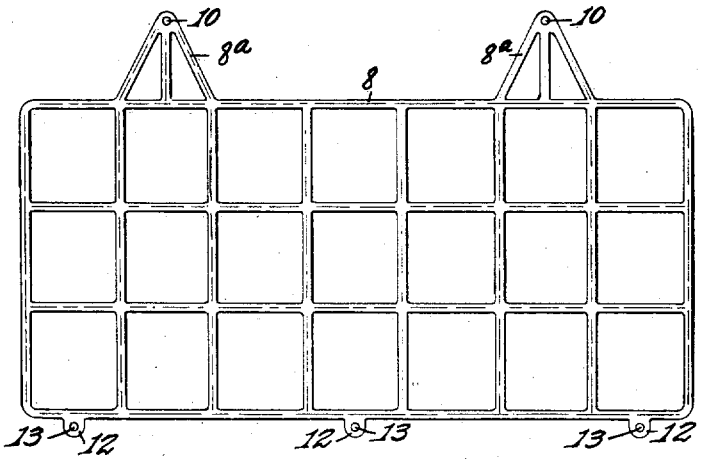
Figure 4 is a side elevation of a grid, detached.
Figure 5:
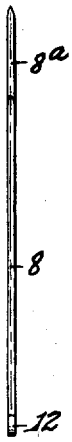
Figure 5 is an end elevation of the same.
Figure 7:
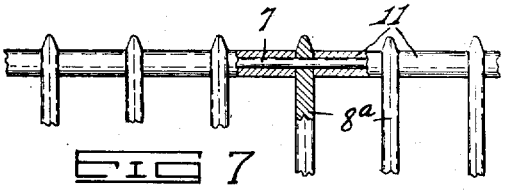
Figure 7 is an enlarged detail view, partly in section, showing the spacers between the upper ends of the grids.

Referring to said drawings, 1 designates the side members, 2 the end members, and 3 the cross members of a cast metal base which is preferably made in a single piece. Provided at appropriate points in each of the side members 1 below the level of the under sides of the cross members 3, or between the ends of adjacent cross members, is a plurality of openings 4, two such openings having rectangular form being herein shown. Said openings 4 have received therein the opposite end portions of the transversely disposed connecting members $5^a$ of two substantially U-shaped lifting bars 5. Said bars, which are substantially rectangular in cross section, have their parallel members $5^b$ rising vertically to a suitable height and carrying at or adjacent to their upper ends a suitable bracing structure 6, the latter being herein shown as rectangular in form.

Parallel transverse rods 7 have their ends mounted in the parallel members $5^b$ of the lifting bars, and mounted on said rods are the suspension members $8^a$ of a plurality of grids 8 and 9 which constitute partition walls or separators whereby the crate is divided into a plurality of parallel compartments, such compartments being designed for the reception of packs or bundles of sheets or plates which are to be pickled. Eyes 10 provided in the suspension members $8^a$ receive the rods 7 therein, while tubular spacers 11 mounted on said rods between adjacent grids serve to maintain the latter in spaced relation.

Formed on the lower edge of each grid 8 and 9 is a plurality of suitably located depending lugs 12 having therein eyes 13 through which are directed transverse rods 14, the lugs of adjacent grids being maintained on said rods in spaced relation by means of tubular spacers 15 similar to the spacers 11. The lugs 12 of the opposite outermost grids are snugly seated in recesses or seats 16 provided therefor in the top surfaces of the side members 1 of the base. Nuts 17 on the ends of the rods maintain the parts in their proper relations.

Each of the outermost grids 9 has formed thereon, preferably as an integral part thereof, a horizontally disposed outwardly projecting ledge 18 provided with a plurality of suitably arranged holes 19 designed for the reception of the downturned ends $20^a$ of two transverse rods 20 whereby is limited the extent to which sheets or packs may be introduced within the compartments of the crates from the opposite ends.

It is to be noted that the grids are removable, thereby to facilitate the removal and replacement of any grid or grids which may become damaged. Further, it will be noted that any of the various parts of the structure, as the lifting bars 5, the rods 7 and 14, the spacers 11 and 15, and the bracing structure 6 may be readily replaced as required. This is particularly desirable in view of the fact that the parts, particularly those which are exposed alternately to the air and to the acid of the pickling bath rapidly deteriorate requiring occasional renewals.

It is to be further noted that the grids constituting the inner partitions 8 and the outer partitions or walls 9 are so formed as to prevent or lessen the protrusion of a portion of a sheet outside the compartment in which it has been placed. Vertical posts, as heretofore used, permit a flexing of the sheet so that a portion thereof bulges outside the compartment in which it has been placed. In the final, or "white" pickling of sheets after final rolling, this tends to produce bending, nicks, or marks in the sheets where they have contacted the posts. The nicking or marking so produced constitutes a serious injury to the sheet. The partition structure herein disclosed avoids this disadvantage.

What I claim is:

1. A sheet pickling crate comprising a base, a plurality of integrally cast grids extending upwardly from said base, each of said grids comprising a plurality of horizontally disposed bars and a plurality of vertically disposed bars lying all in the same plane, said grids being attached to the base in mutually spaced arrangement to provide perforate sheet confining walls giving both vertical and lateral support to the faces of the sheets.

2. A sheet pickling crate comprising a base, a plurality of integrally cast grids extending upwardly from said base, each of said grids comprising a plurality of intersecting bars lying in the same plane, said grids being attached to the base in mutually spaced arrangement to provide perforate sheet confining walls giving both vertical and lateral support to the faces of the sheets.

3. A sheet pickling crate comprising a base, side members, upper tie members interconnecting said side members, and a plurality of grids extending upwardly from said base; each of said grids comprising a plurality of intersecting bars and members for attaching the grid to the base and to the upper tie members, the grid as a whole being cast in a single piece with all the bars lying in the same plane.

4. A sheet pickling crate comprising a base, side members, upper tie members interconnecting said side members, and a plurality of grids extending upwardly from said base; each of said grids comprising a plurality of horizontally disposed bars, a plurality of vertically disposed bars, and members for attaching the grid to the base and to the upper tie members, the grid as a whole being cast in a single piece with all the bars and the attaching members lying in the same plane.

5. A pickling crate comprising a base having side members, lifting arms of approximately U-shape disposed in supporting relation to said base, transverse rods connecting the parallel members of said arms adjacent to the upper ends of the latter, a plurality of grids having their upper portions mounted on said rods, rods upon which the lower edge portions of said grids are mounted, and means carried by each of said rods whereby the grids are maintained in spaced relation.

6. A pickling crate comprising a base having side members, said members being provided with seats, lifting arms disposed in supporting relation to said base, transverse rods connecting the parallel members of said arms adjacent to their upper ends, a plurality of grids suspended from said rods, apertured lugs formed on the lower edge portions of said grids, transverse rods received in the apertures of said lugs, and means carried by said rods whereby said grids are maintained in spaced relation, the lugs of the outermost grids being received by the seats of the base.

7. A pickling crate comprising a base having side members, said members being provided with seats, lifting arms disposed in supporting relation to said base, transverse rods connecting the parallel members of said arms adjacent to their upper ends, a plurality of grids suspended from said rods, apertured lugs formed on the lower edge portions of said grids, transverse rods received in the apertures of said lugs, and tubular members carried by each of said rods for maintaining said grids in spaced relation, the outermost grids having the lugs thereof resting on the seats of the side members of the base.

8. A pickling crate comprising a base having side members lifting arms of approximately U-shape disposed in supporting relation to said base, transverse rods connecting the parallel members of said arms adjacent to the upper ends of the latter, a plurality of grids suspended from said rods, transverse rods connecting the lower portions of said grids, means carried both by the upper and lower rods for maintaining said grids in spaced relation, and lugs formed on the lower portions of the outermost grids for engaging the seat on the side members of the base.

9. A pickling crate comprising a base having side members, lifting arms of approximately U-shape disposed in supporting relation to said base, transverse rods connecting the parallel members of said arms adjacent to the upper ends of the latter, a plurality of grids suspended from said rods, transverse rods connecting the lower portions of said grids, means carried both by the upper and lower rods for maintaining said grids in spaced relation, lugs formed on the lower portions of the outermost grids for engaging the seat on the side members of the base, and a frame structure carried by the upper end portions of said lifting arms whereby the latter are rigidly braced.

In testimony whereof, I hereunto set my hand.

CHARLES W. HALLER.